Patented May 21, 1929.

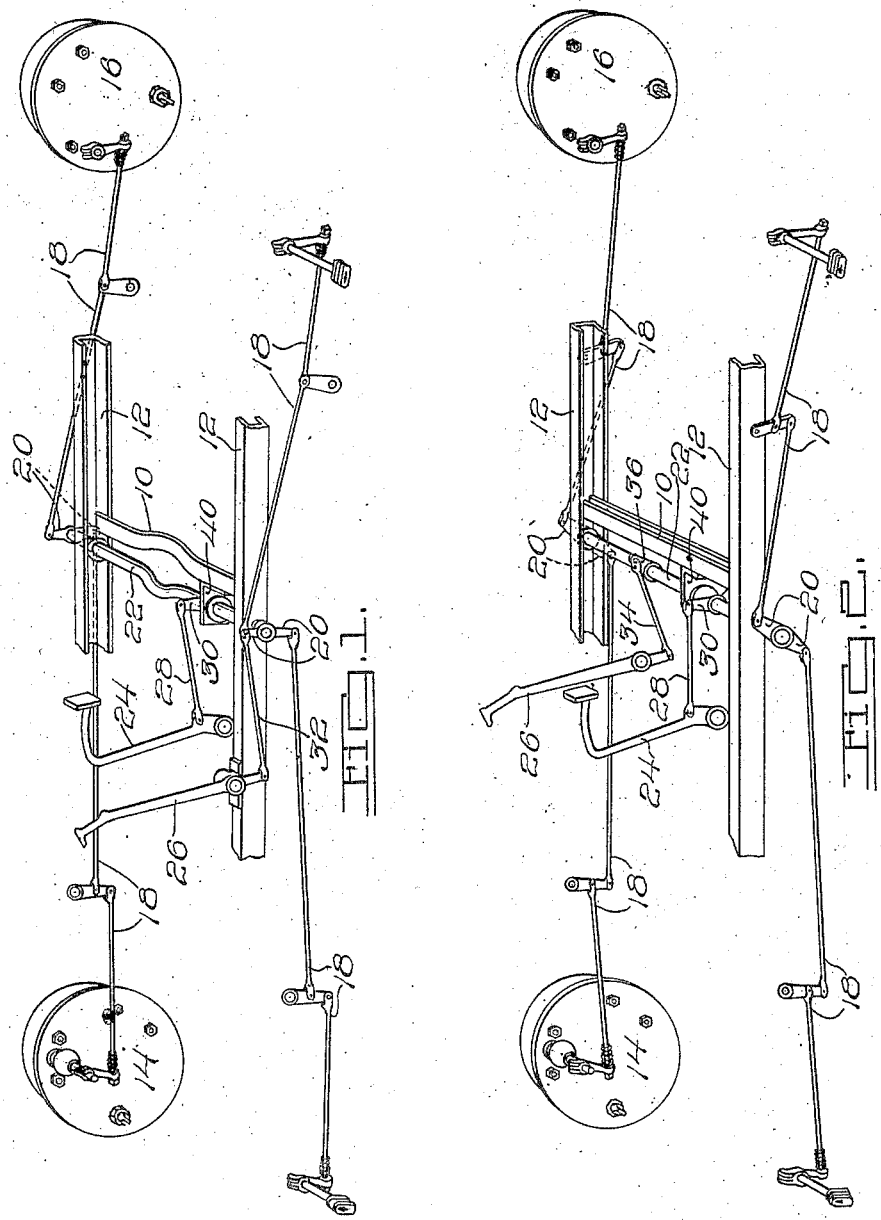

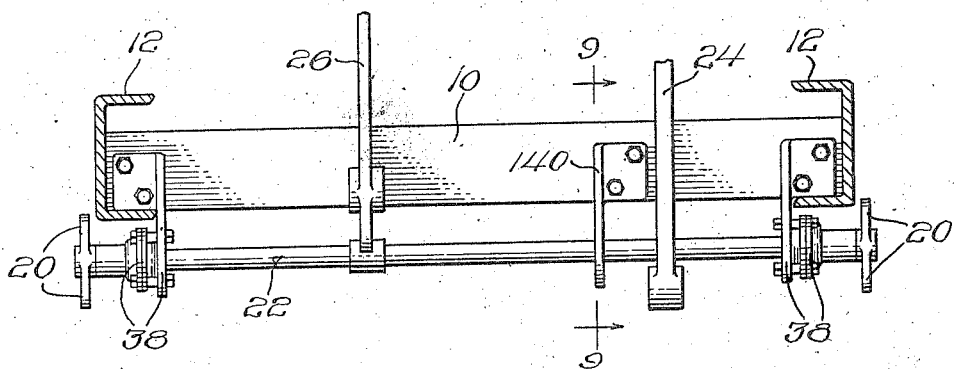
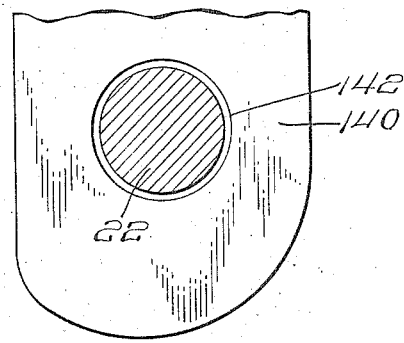

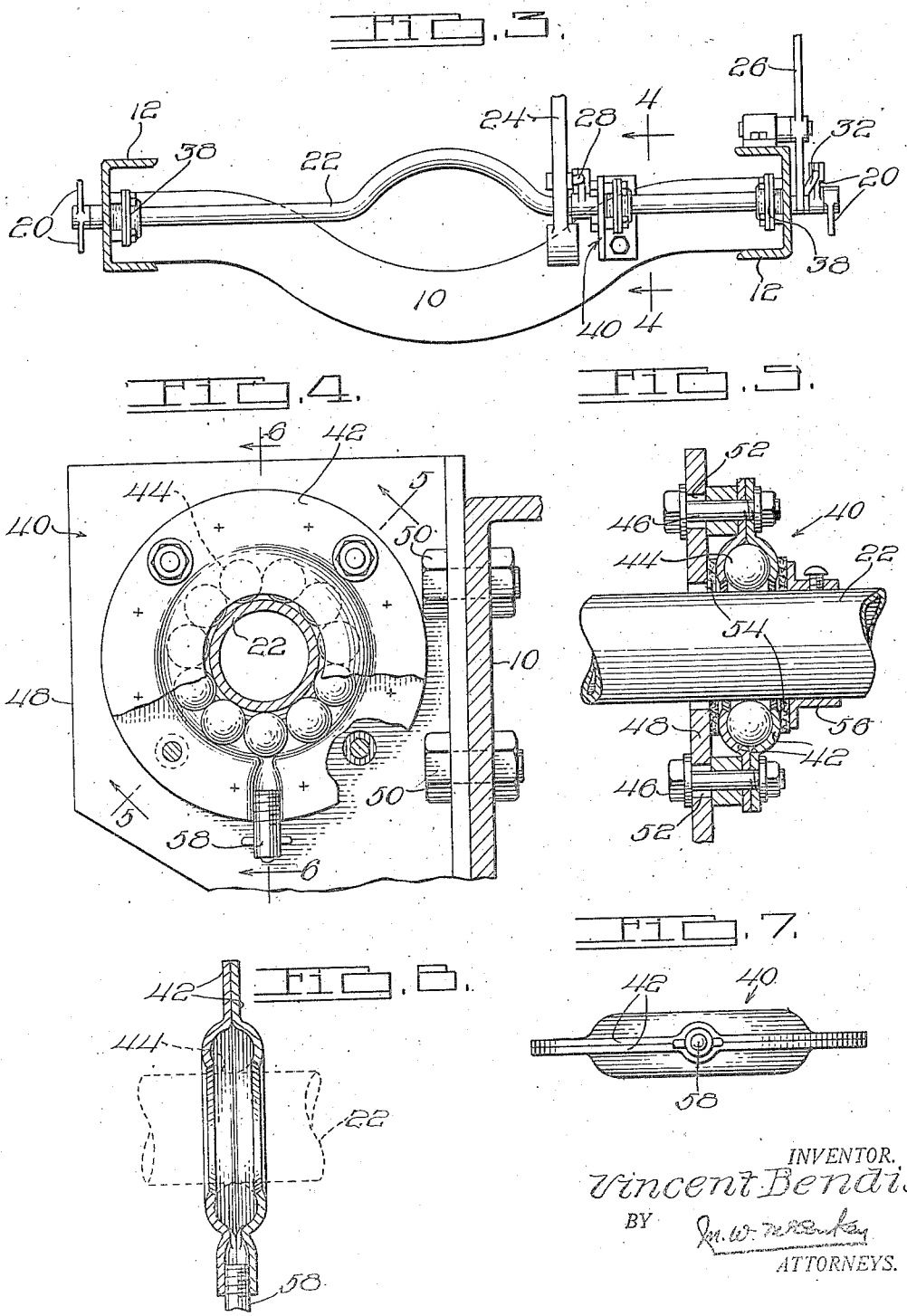

1,713,687

UNITED STATES PATENT OFFICE.

VINCENT BENDIX, OF CHICAGO, ILLINOIS, ASSIGNOR TO BENDIX BRAKE COMPANY, OF SOUTH BEND, INDIANA, A CORPORATION OF ILLINOIS.

BRAKE-OPERATING CONNECTION.

Application filed April 16, 1928. Serial No. 270,184.

This invention relates to brakes, and is illustrated as embodied in novel operating mechanism for a set of four-wheel brakes for an automobile.

It is now generally recognized that the safety of a car is increased rather than decreased by using the regular four-wheel brake system for emergency purposes as well as for service, instead of providing additional emergency brakes, provided the operating connections are so arranged that no failure short of a complete wreck will leave the car entirely without brakes. This is accomplished in the simplest, and therefore usually the best, manner by providing a single heavy shaft, rigidly mounted in the chassis frame, which shaft is connected to all four of the brakes and which is operated alternatively by either the footpedal or the hand lever (or their equivalents).

While such a shaft is so safe and solid that the breakage of one has not been known to occur in all the many millions of cars heretofore built, it is my aim to eliminate the last remote chance of complete failure of the braking system by arranging for supporting and operating this shaft in such a manner that even if it should be broken the car will still have at least two brakes which are operative without any sacrifice of effectiveness. This I accomplish by providing fixed bearings for the ends of the shaft, in combination with means which will serve as a third bearing at least in case the shaft is broken, and which is arranged between the two shaft-operating connections, that is ordinarily between the connections from the pedal and the hand lever. Thus even if the shaft is broken, one end or the other of it can still be operated to apply the corresponding brakes.

Various minor but important features of novelty relate to the detail structure of this third bearing, to an adjustment permitting the ready alinement of the three bearings, and to other desirable details of construction which will be apparent from the following description of the illustrative embodiments shown in the accompanying drawings, in which:

Figures 1 and 2 are diagrammatic perspectives of two automobile chassis embodying different forms of the invention;

Figure 3 is a section through the chassis of Figure 1, ahead of the shaft and looking toward the rear of the car, and showing the shaft in front elevation;

Figure 4 is a section through the shaft on the line 4—4 of Figure 3 and showing the third bearing in elevation;

Figure 5 is a section through the third bearing on the line 5—5 of Figure 4;

Figure 6 is another section through the bearing, on the line 6—6 of Figure 4;

Figure 7 is a bottom plan view of the bearing;

Figure 8 is a section corresponding to Figure 3 but showing a different embodiment of the invention; and Figure 9 is a section on the line 9—9 of Figure 8, showing the lower part of the bearing in side elevation.

The chassis shown in all the figures include the usual frame, ordinarily having one or more cross members 10 connecting the opposite side members 12, and which is supported by the usual springs (not shown) on front and rear axles (not shown), which in turn are carried by road wheels (not shown) having front brakes 14 and rear brakes 16. The brakes may be operated by tension rods or cables 18 connected to four operating arms or levers 20 on a single heavy transverse shaft 22. The shaft can be operated by either of two operating devices, shown as a service pedal 24 and an emergency hand lever 26.

In the arrangement of Figure 1, the pedal 24 is connected by means such as a link 28 to an arm 30 between the ends of shaft 22, while lever 26 is connected by means such as a link 32 to one of the arms 20 on the left end of shaft 20. In this arrangement the pedal would ordinarily be pivoted on the transmission or clutch housing (not shown) and the lever 26 on the left side member 12. The arrangement of Figure 2 is different, in that the lever 26 is mounted approximately in the center of the car, being mounted on the transmission or clutch housing if desired, and being connected by means such as a link 34 to an arm 36 on shaft 22. This same arrangement is shown in Figure 8.

The present invention has to do with the supporting and arrangement of shaft 22 or its equivalent. In each instance it is rigidly mounted in the frame, preferably by means of two bearings 38 in which it is journaled adjacent its ends, and which are permanently bolted to the side frame members 12. It also has in each instance a third device adapted to serve as a bearing at least in case the shaft breaks, and which is arranged between the pedal and hand lever connections.

In Figures 1 and 3-7, the third bearing, indicated generally by reference character 40, is of the same type of construction as the end bearings 38, and preferably is built up of two annular stampings 42 containing an annular series of balls or other anti-friction devices 44 in which the shaft is journaled, and which are connected by means such as bolts 46 to a heavy stamped steel bracket 48 permanently secured by bolts 50 or the like to the cross frame member 10. This subject-matter is not claimed herein, being covered by my individual application No. 343,317, filed February 28, 1929.

Preferably bolts 46 pass through relatively large openings 52 in bracket 40, so that the three bearings may be alined. This may be done by mounting the shaft and its three bearings 38 and 40, with bolts 46 loose, in place in the chassis, so that the shaft itself automatically adjusts bearing 40, after which bolts 46 are tightened. Felt washers 54 may be confined between bracket 48 and a collar 56 on shaft 22, to hold in the bearing grease or other lubricant introduced through a fitting 58.

I prefer to mount bearing 40 immediately beside arm 30 connected to pedal 24, so that the bearing takes any bending stress on the shaft from the pedal, and permits a lighter shaft to be used, the one shown being tubular in form and of comparatively light gage steel. The bearing 40, as noted above, must be between the pedal and hand lever connections, to cooperate with one or the other of the bearings 38 in case the shaft should break.

The arrangement of Figure 2 differs from that described above only in that, since hand lever 26 is in the center of the car, bearing 40 must be on the other side of arm 30, so that it will still be between the pedal and hand lever.

The arrangement of Figures 8 and 9 differs from that of Figure 2 in that the bearing 140 is purely a safety device, having a relatively large opening 142 for shaft 22, so that it only engages the shaft in case the shaft breaks. The safety bearing above described is not claimed herein, the same being described and claimed in my co-pending divisional application No. 343,318, filed February 28, 1929.

While several illustrative embodiments have been described in detail, it is not my intention to limit the scope of the invention to those particular embodiments, or otherwise than by the terms of the appended claims.

I claim:

1. A vehicle having, in combination with a frame and a set of brakes, a shaft operating the brakes, two bearings for the shaft supported by the frame adjacent the opposite ends of the shaft, two operating devices having connections to the shaft, and a device adapted to serve as a third bearing for the shaft and which is supported by the frame between the two connections to the shaft from the two operating devices.

2. A vehicle having, in combination with a frame and a set of brakes, a shaft operating the brakes, two bearings for the shaft supported by the frame adjacent the opposite ends of the shaft, two operating devices having connections to the shaft, and a device adapted to serve as a third bearing for the shaft and which is supported by the frame between the two connections to the shaft from the two operating devices immediately adjacent one of said connections.

3. A vehicle having, in combination with a frame and a set of brakes, a shaft operating the brakes, two bearings for the shaft supported by the frame adjacent the opposite ends of the shaft, two operating devices having connections to the shaft, and a device adapted to serve as a third bearing for the shaft and which is supported by the frame between the two connections to the shaft from the two operating devices, said device having a portion in which the shaft is journaled and which is provided with antifriction means engaging the shaft.

4. A vehicle having, in combination with a frame and a set of brakes, a shaft operating the brakes, two bearings for the shaft supported by the frame adjacent the opposite ends of the shaft, two operating devices having connections to the shaft, and a device adapted to serve as a third bearing for the shaft and which is supported by the frame between the two connections to the shaft from the two operating devices, said device being adjustably mounted with respect to the frame so that it may be alined with the two bearings.

5. A vehicle having, in combination with a frame and a set of brakes, a shaft operating the brakes, two devices serving as bearings for the shaft, and which are supported by the frame adjacent the opposite ends of the shaft, two operating members having connections to the shaft, and a third device adapted to serve as a third bearing for the shaft and which is supported by the frame between the two connections to the shaft from the two operating devices, at least one of said devices being adjustable with respect to the other two.

In testimony whereof, I have hereunto signed my name.

VINCENT BENDIX.